(12) United States Patent
Veligdan

(10) Patent No.: US 6,327,416 B1
(45) Date of Patent: Dec. 4, 2001

(54) FLEXIBLE OPTICAL PANEL

(75) Inventor: James T. Veligdan, Manorville, NY (US)

(73) Assignee: Brookhaven Science Associates, Upton, NY (US)

( * ) Notice: Subject to any disclaimer, the term of this patent is extended or adjusted under 35 U.S.C. 154(b) by 0 days.

(21) Appl. No.: 09/490,144

(22) Filed: Jan. 24, 2000

(51) Int. Cl.$^7$ ...................................................... G02B 6/00
(52) U.S. Cl. ...................... 385/901; 385/120; 385/135; 362/551; 362/554
(58) Field of Search ............................... 385/901, 16, 14, 385/15, 116, 120, 123, 130, 131, 135, 137; 362/551, 554

(56) References Cited

U.S. PATENT DOCUMENTS

| 5,381,502 | 1/1995 | Veligdan | 385/115 |
|---|---|---|---|
| 5,625,736 | * 4/1997 | Veligdan | 385/120 |
| 5,668,907 | * 9/1997 | Veligdan | 385/120 |
| 6,002,826 | * 12/1999 | Veligdan | 385/120 |

OTHER PUBLICATIONS

Rohm and Haas Company, "OptiFlex", technical data, Jul. 1996, four pages.

* cited by examiner

*Primary Examiner*—Phan T. H. Palmer
(74) *Attorney, Agent, or Firm*—Reed Smith LLP

(57) ABSTRACT

A flexible optical panel includes laminated optical waveguides, each including a ribbon core laminated between cladding, with the core being resilient in the plane of the core for elastically accommodating differential movement thereof to permit winding of the panel in a coil.

20 Claims, 3 Drawing Sheets

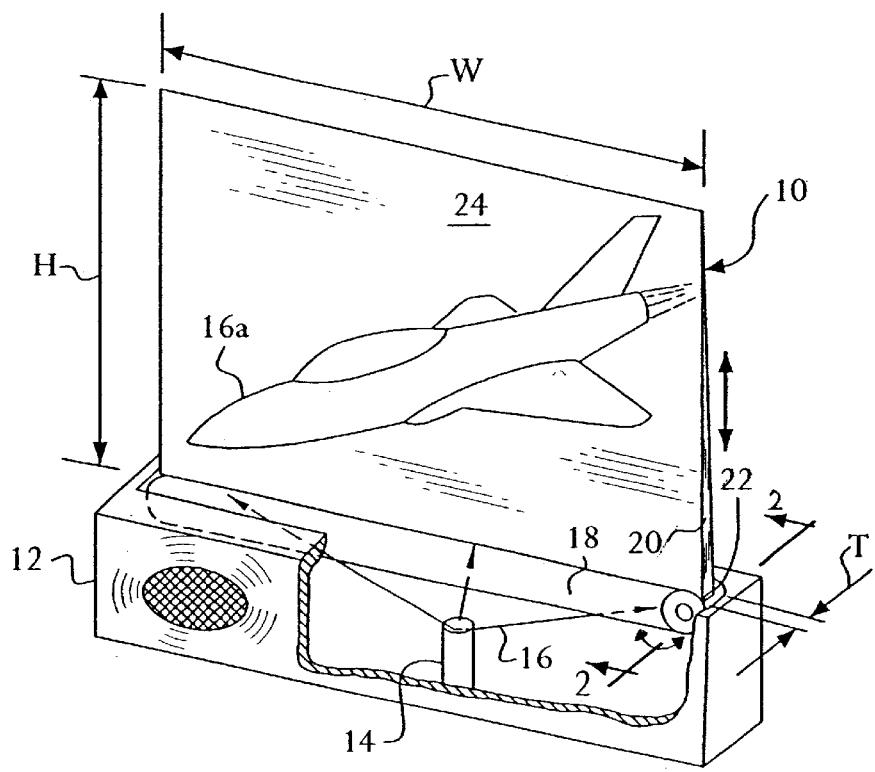
FIG. 1
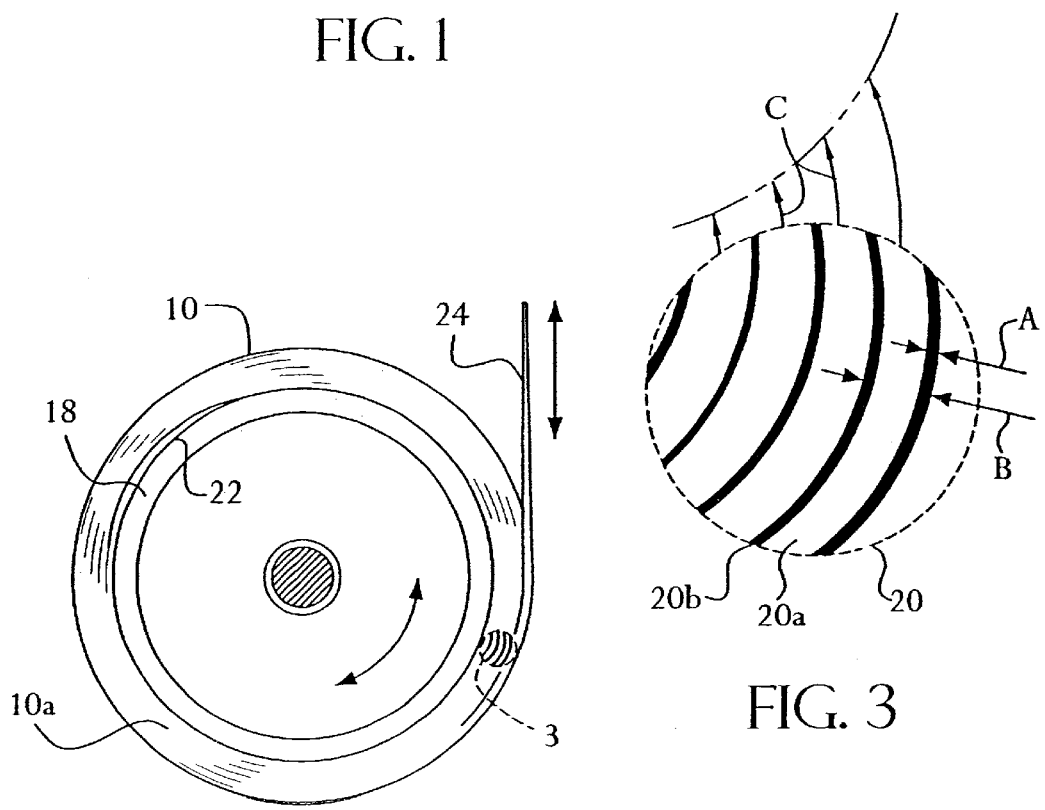
FIG. 2
FIG. 3

FLEXIBLE OPTICAL PANEL

This invention was made with Government support under contract number DE-AC02-98CH10886, awarded by the U.S. Department of Energy. The Government has certain rights in the invention.

BACKGROUND OF THE INVENTION

The present invention relates generally to optical waveguides, and, more specifically, to optical panels formed therefrom.

U.S. Pat. No. 5,381,502 discloses a thin optical panel having optical waveguides stacked together in laminated sheets. Each waveguide includes a central optical core bound between cladding layers. The cladding has an index of refraction less than that of the core for effecting total internal reflection as light is transmitted through the core.

The waveguides have opposite ends which define a respective inlet face for receiving projected light, and an outlet face or screen for displaying the light in any suitable form such as a video image. In an exemplary embodiment, the waveguides are beveled at their outlet ends at a small acute angle of up to a few degrees, and their inlet ends are coplanar with each other to position the inlet face obliquely or generally perpendicular to the screen.

The waveguides extend the full width of the screen, and the height of the screen corresponds with the total number of laminated waveguides. The screen may be exceptionally thin on the order of one or two centimeters, with a multitude of waveguides of corresponding thinness being used. For example, 525 waveguides may be laminated together for effecting 525 vertical lines of resolution for use in projecting a television image.

In this construction, the individual waveguide cores are extremely thin, on the order of about 50 microns, for example. The cores are made of an optically transmissive material such as glass or plastic acrylics or polycarbonates. In thin sheets the individual cores are relatively flexible in bending while still retaining lateral rigidity and brittleness in the planes of the sheets.

However, the multiple cores are laminated together with the cladding therebetween, typically in the form of a suitable adhesive such as epoxy. Once the multiple cores are laminated together in this manner, they are bonded to each other and become quite rigid in their bending direction across the laminations. The laminated panel is therefore rigid not only laterally along the longitudinal and transverse directions in the planes of the individual cores, but is also rigid orthogonally thereto across the section of the laminated waveguides. The optical panel thusly has structural rigidity and integrity, and is self supporting when mounted in a suitable housing or cabinet, or when mounted on a wall, for example.

A particular advantage of this form of laminated optical panel is its unlimited size potential. Such panels may be made from small size to exceptionally large size by simply controlling the size of the individual waveguides themselves.

In large size, the practicality of transportation thereof becomes a problem. For large, portable optical panels, the rigid construction of the laminated waveguides substantially increases the difficulty of packaging, handling, and transportation, as well as requiring a large space for the storage of the panel when not in use.

Accordingly, it is desired to provide a compact, portable optical panel irrespective of the large size thereof.

BRIEF SUMMARY OF THE INVENTION

A flexible optical panel includes laminated optical waveguides, each including a ribbon core laminated between cladding, with the core and cladding being resilient in the plane of the core and cladding, respectively, for elastically accommodating differential movement thereof to permit winding of the panel in a coil.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 1 is a schematic, isometric view of an exemplary flexible optical panel in a deployed configuration in accordance with an exemplary embodiment of the present invention.

FIG. 2 is a side view of the optical panel illustrated in FIG. 1 would in a coil in a retracted configuration.

FIG. 3 is a detailed view of the coil at reference number 3 shown in a retracted configuration.

DETAILED DESCRIPTION OF THE INVENTION

Figure 5:
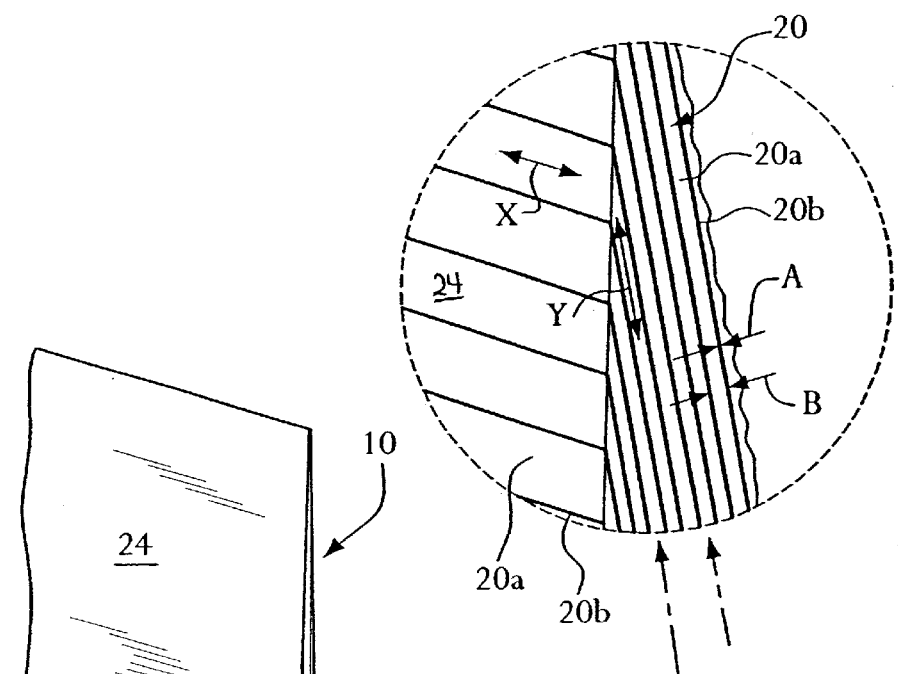
FIG. 5 is a detailed view of the optical panel illustrated in FIG. 4 at reference number 5 shown in the deployed configuration.

Illustrated in FIG. 1 is a flexible optical panel 10 shown in a deployed configuration in accordance with an exemplary embodiment of the present invention. The panel may be mounted in a suitable housing or cabinet 12 which includes a suitable light projector 14 configured for projecting light 16 through the panel for display as an image 16a thereon, such as a video image.

In the exemplary embodiment illustrated in FIG. 1, the panel 10 is used in combination with a cylindrical spool 18 suitably attached thereto for winding and retracting the panel in a coil 10a, as shown in FIG. 2, within the cabinet when desired. The spool 18 may be manually or motor driven to deploy or retract the panel in any convenient manner. In the exemplary embodiment, the panel is retracted downwardly into the cabinet for storage therein and deployed upwardly therefrom, although in alternate embodiments the cabinet may be mounted above the panel, and deployment and retraction are reversed.

Figure 4:
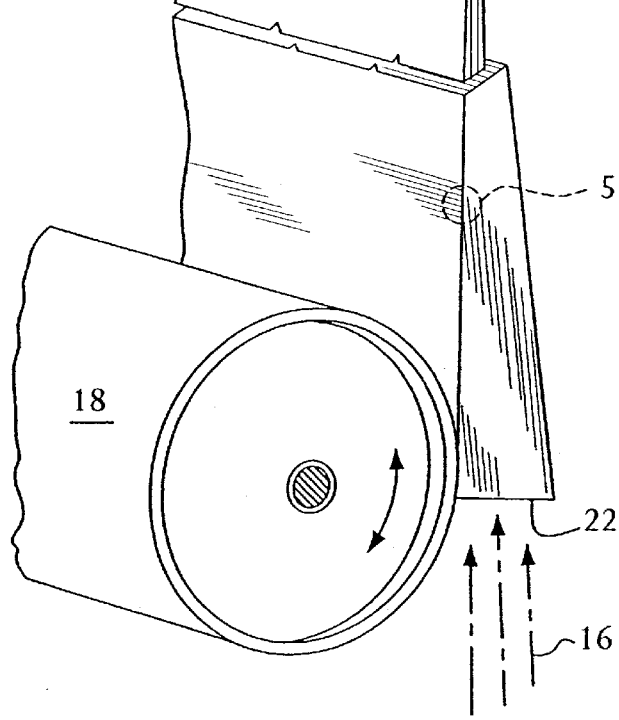
FIG. 4 is an enlarged view of exemplary portions of the optical panel illustrated in FIG. 1 in the deployed configuration.

The panel 10 and cooperating spool 18 are illustrated in more detail in FIGS. 4 and 5 with exaggerated dimensions for clarity of presentation. Except for the flexibility and composition of the panel 10 of the present invention, panel 10 function similarly to the panel disclosed in the above-referenced patent. As indicated above, the optical panel disclosed in that patent is rigid in view of the laminated construction of the glass or plastic cores and adhesive cladding therebetween.

In accordance with the present invention, the optical panel 10 is flexible to permit rolling or winding thereof into the coil 10a illustrated in FIG. 2, with a plurality of overlapping and nested turns with a suitably small diameter.

As shown in FIG. 4, the panel includes a plurality of thin optical waveguides 20 laminated together in the exemplary wedge configuration illustrated. The individual waveguides have respective first ends collectively defining a first or inlet face 22 for receiving the image light 16 from the projector. The waveguides also include opposite second ends collectively defining a second or outlet face in the form of a display screen 24 for displaying the image light after transmission through the waveguides.

Each waveguide 20 includes an optical core 20a in the preferred form of a ribbon or sheet which is laminated between reflective layers of cladding 20b. The core 20a is optically transmissive and has an index of refraction which is greater than that of the cladding for effecting substantially total internal reflection in a conventional manner. In this way, the image light 16 enters the waveguides through the inlet 22 and is reflected inside the waveguides for discharge from the screen 24 in the desired image.

Since conventional optical cores formed of glass or plastic are laterally rigid in sheet form, when laminated together with conventional cladding the resulting optical panel is rigid. In accordance with the present invention, the material composition of the waveguides 20 is selected for being resilient and flexible in the respective corresponding planes of the waveguides for elastically accommodating differential movement thereof under force to permit rolling or winding of the panel in the coil 10a with multiple overlapping turns.

In a practical application, a multitude of thin waveguides 20 are laminated together to form a large and high resolution flexible screen 24 having a corresponding number of waveguide second ends. For example, the number of laminated waveguides may be in the range of 500–700 sheets, each being about 10 microns thick.

In order to maximize the percentage of light carrying area of the panel, the cladding 20b is substantially thinner than the adjoining cores 20a, with the cladding having a thickness A substantially less than the thickness B of the individual cores. For example, the cladding thickness A which may be about one micron, with the thickness B of the individual cores being about nine microns.

In a preferred embodiment, the ribbon optical cores 20a and cladding 20b are resilient and flexible in the respective corresponding planes of the cores and claddings for effecting elastic deformation laterally therein to permit winding in the desired coil in a plurality of arcuate turns generally concentric with each other in a spiral of contacting surfaces.

The significance of this in-plane lateral flexibility of the waveguides may be better appreciated from the enlarged section of the wound panel illustrated in FIG. 2. By analogy, bending a stack or deck of ordinary playing cards causes sliding between the cards along the direction of bending, with the ends of the cards being sequentially offset from each other. When the deck of cards is unloaded, the displaced ends thereof return to alignment in a single plane. Bending of the card deck effects frictional shear loads between the cards which is overcome as the cards slide over each with differential movement due to the bending. If this differential lateral movement between the cards is prevented or opposed, the deck of cards will correspondingly resist bending in a rigid manner.

Similarly, the laminated waveguides illustrated in FIG. 2 must permit lateral differential movement between the individual waveguides in order to bend into the desired coil without permanent distortion, buckling, or damage. The waveguides are laminated together in large number and suitable differential movement therebetween must be permitted in order to coil the panel to a relatively small outer diameter.

In order to provide some in-plane lateral resiliency in the waveguides, the cladding 20b preferably comprises silicone, which is preferably black for increasing contrast of the screen. However, since the cladding is preferably substantially thinner than the optical cores, the cladding alone is insufficient to permit flexible winding of the panel in a small diameter.

In the preferred embodiment illustrated in FIGS. 3 and 5, the individual optical cores 20a are formed of a suitable material which is resilient and flexible transversely Y in the corresponding lateral planes of the cores for effecting elastic deformation under force to permit flexible winding into the desired diameter coil 10a. The material of the optical cores 20a may also optionally be resilient and flexible longitudinally X along the width of the screen 24.

The optical panel 10 is shown in FIG. 2 in a relatively small diameter coil 10a wound around the spool 18 in the substantially rolled-up or retracted configuration. Since the optical panel is initially generally flat when unwound, winding of the panel around the spool requires differential lateral movement between the waveguides. The greater the number of coil turns and the smaller the diameter of the coil, the greater will be the differential movement between the waveguides on opposite sides of the panel.

In FIG. 2, the screen 24 initially wraps around the spool 18 and then around the opposite back side of the panel as successive turns are formed. As the winding occurs, the successively radially outer waveguides experience a differential movement C along the direction of rolling, which increases in the radially outer direction. In order to permit suitable differential movement of the waveguides as the panel is wound, the optical cores 20a are preferably resilient and elastic so that they may elastically deform as the panel is wound. When the panel is unwound, the individual cores are returned to their undeformed states for maintaining the initial integrity and configuration of the overall panel.

The optical cores 20a therefore require suitable elastic resiliency, but must also be optically transmissive with good efficiency. Good optical performance is required in the unwound and undistorted configuration of the panel, and is generally not relevant when the panel is wound for storage or transportation.

A suitable resilient optical material for the cores 20a is preferably crosslinked polyacrylate copolymer commercially available from Rohm and Haas Company of Philadelphia, Pa. This company offers a flexible light pipe under the OptiFlex trademark known as OptiFlex lightguide Model 7100 which has a cylindrical optical core surrounded in turn by a tubular Teflon (trademark) cladding and polyethylene sheathing. The optical core material of the OptiFlex light pipe may be reconfigured in accordance with the present invention in ribbon or sheet form suitably bonded between cladding layers, preferably formed of black silicone which may be Silicone II Stock #5030 from the GE Company, and which provides integral bonding between the adjoining cores for structural integrity of the entire optical panel. Teflon cladding may alternatively be used provided that it can be joined to the adjacent cores in an integral lamination.

By using an optical core material that is resilient and elastic in all directions, the ribbon form thereof is resilient both longitudinally and transversely in the plane of lamination for accommodating shear loads between the adjoining cores with corresponding elastic deformation therebetween as the panel is rolled. Since the cores are substantially thicker than the intervening cladding, most of the available thickness of the panel can be used to accommodate shear loads under rolling with corresponding elastic deformation therein. The silicone cladding is also resilient and elastic in the plane of lamination and additionally accommodates the shear loads and corresponding elastic deformation.

Accordingly, by introducing lateral flexibility in the planes of lamination of the individual waveguides, the entire panel may be made sufficiently flexible for bending and rolling into a multi-turn coil of suitably small diameter. The panel, itself, may be so wound in a small tubular volume for storage or transportation as desired. Or the panel may be suitably joined to the cooperating spool 18 around which the panel may be wound for retraction or deployment as desired.

In many embodiments contemplated, such as the preferred embodiment illustrated in FIGS. 1–5, the screen 24 is preferably planar when unwound into its deployed configuration. The planar screen may be flat, or curved in one or more directions such as concave or spherical as desired. An initially flat screen will most readily wind into a coil with minimal elastic distortion. A partly spherical screen may also be wound into a corresponding coil, but with a corresponding increase in distortion. In either example, the screen may be unwound to an undistorted configuration corresponding with the initial design intent therefor.

In the exemplary embodiment illustrated in FIGS. 1–5, the screen 24 is preferably oblique with its inlet 22, and the waveguides 20 are inclined therebetween at a relatively small acute angle to the screen on the order of one or two degrees.

In this configuration, the outlet second ends of the waveguides are preferably beveled at an acute angle and are collectively coplanar at the screen 24 for defining a substantially flat screen. Correspondingly, the inlet first ends of the waveguides are also collectively coplanar at the inlet 22 to form a flat surface for receiving the incident light 16 from the projector 14.

As shown in FIG. 1, the waveguides 20 preferably extend longitudinally along the width W of the screen 24, as well as along the length of the spool 18 corresponding to the coil 10a of FIG. 2, and extend also transversely along the height H of the screen. The thickness T of the screen varies from a minimum at the top of the beveled panel to a maximum at the inlet 22 at the bottom of the panel which typically corresponds with the maximum number of laminated waveguides in the panel.

As shown in FIG. 4, the spool 18 adjoins the screen 24 at the inlet 22 of the panel and may be suitably attached thereto by bonding for example, so that the panel may be wound around the spool into the corresponding coil 10a therearound as shown in FIG. 2. The bonding used may be, for example, epoxy, adhesive or various mechanical fasteners.

Figures 6, 7:
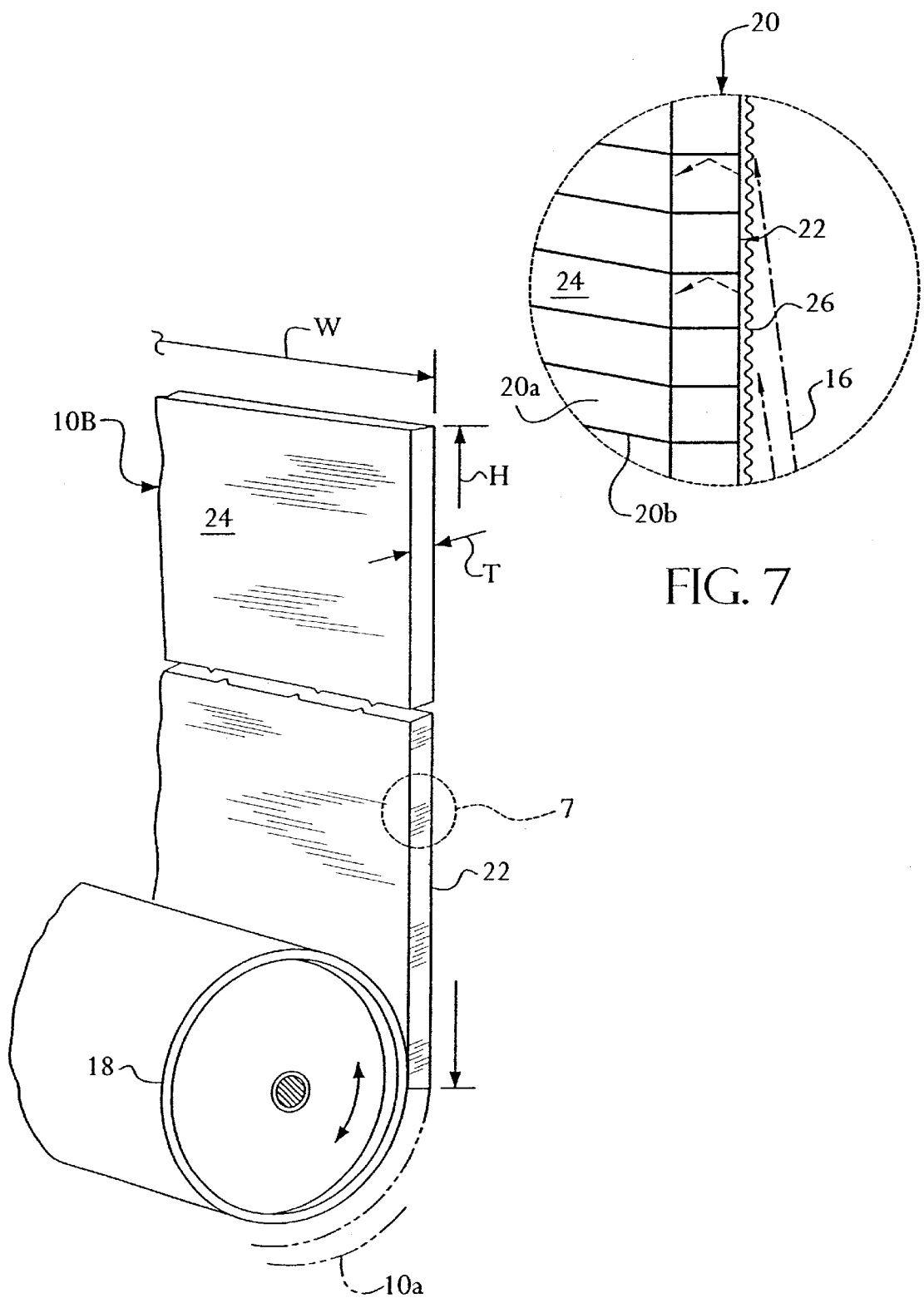
FIG. 6, like FIG. 4, is an enlarged isometric view of exemplary portions of the optical panel in accordance with an alternate embodiment of the present invention.
FIG. 7 is a detailed view of the optical panel illustrated in FIG. 6 at reference number 7.

Various forms of flexible optical panels may now be created using the flexible optical cores and corresponding adhesive cladding therebetween FIG. 6 illustrates an alternate embodiment of an optical panel, designated 10C, which may use the flexible waveguides 20 configured in a different form. In this embodiment, the screen 24 is parallel to the inlet 22 disposed on the opposite, back side of the panel.

Also in this configuration, a light coupler 26 is suitably bonded over the back inlet 22 for redirecting the light 16 through the waveguides from the projector disposed at the bottom of the panel in the same configuration illustrated in FIG. 1. The coupler 26 preferably comprises fresnel prismatic grooves which are straight along the width of the panel and are spaced vertically apart along the height of the panel. A preferred form of the prismatic coupler 26 is a Transmissive Right Angle Film (TRAF) commercially available from the 3M Company of St. Paul, Minn. under the tradename TRAF II.

In this configuration, the screen 24 is preferably planar when the panel is unwound, and is preferably flat. The waveguides 20 extend longitudinally along the width W of the screen 24, and transversely along the thickness T of the panel. The waveguides are therefore stacked in a column from the bottom to the top of the panel without inclination or bevel, as compared with the embodiment illustrated in FIG. 1.

Accordingly, the waveguides 20 in FIGS. 6 and 7 define long and slender strips which extend longitudinally along the length of the spool 18 and the resulting coil 10a, and their transverse dimension, as represented by the panel thickness T, extends radially from the spool 18 as the panel is wound thereon. In this embodiment, shear loads between the adjoining waveguides and differential shear movement therebetween is considerably less than that for the panel embodiment illustrated in FIG. 1 which permits a tighter winding of the panel 10B if desired.

The ability to make the laminated optical panels disclosed above suitably flexible permits the winding thereof in correspondingly small coils. The panel coils may be stored and shipped in this form for corresponding advantage, while being unwound to full size for subsequent use. In a projection TV configuration of the optical panel, a relatively small cabinet may be provided therefor for reducing space requirements while permitting the panel to be extended and deployed to full size for viewing when desired.

The flexible ribbon cores of the present invention may be applied to other forms of the optical panel as desired for providing flexibility thereof for the advantages presented herein.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A flexible optical panel comprising laminated optical waveguides having first ends defining an inlet for receiving light and opposite second ends defining a screen for displaying said light, with each waveguide including a ribbon optical core laminated between cladding, and said waveguides being resilient in the respective corresponding planes of the waveguides for elastically accommodating differential movement thereof to permit winding of said panel in a coil.

2. A panel according to claim 1 further comprising a multitude of said laminated waveguides having a corresponding number of second ends defining said screen, and said screen is windable in a plurality of turns in said coil.

3. A panel according to claim 2 wherein said ribbon optical cores are resilient in corresponding planes of said cores for effecting elastic deformation laterally therein to permit winding into said coil.

4. A panel according to claim 3 wherein said screen is parallel to said inlet.

5. A panel according to claim 4 wherein said screen is planar unwound.

6. A panel according to claim 5 wherein said waveguides extend longitudinally along the width of said screen, and transversely along the thickness of said panel.

7. A panel according to claim 6 wherein said waveguides extend longitudinally along the length of said coil.

8. A panel according to claim 6 wherein said cores comprise flexible crosslinked polyacrylate copolymer, and said cladding comprises black silicone.

9. A panel according to claim 3 wherein said screen is oblique with said inlet, and said waveguides are inclined therebetween.

10. A panel according to claim 9 wherein said waveguide second ends are beveled and coplanar at said screen.

11. A panel according to claim 9 wherein said waveguides extend longitudinally along the width of said screen and along the length of said coil, and transversely along the height of said screen.

12. A panel according to claim 11 in combination with a spool adjoining said screen at said inlet for winding said panel into said coil therearound.

13. A panel according to claim 3 wherein:
said waveguides extend longitudinally along the width of said screen and transversely along the height of said screen; and
said cores are resilient both longitudinally and transversely in said planes thereof for effecting elastic deformation under force to permit winding into said coil.

14. A panel according to claim 13 wherein said screen is oblique with said inlet, said waveguides are inclined therebetween, and said waveguides second ends are beveled and coplanar at said screen.

15. A panel according to claim 14 wherein said cores comprise flexible crosslinked polyacrylate copolymer, and said cladding comprises black silicone.

16. A panel according to claim 3 wherein said cores comprise flexible crosslinked polyacrylate copolymer.

17. A panel according to claim 16 wherein said cladding comprises black silicone.

18. A panel according to claim 3 wherein said cladding is thinner than adjoining cores.

19. A panel according to claim 3 wherein said cores are resilient both longitudinally and transversely in said planes thereof for effecting elastic deformation under force to permit winding into said coil.

20. A panel according to claim 3 wherein said screen is planar unwound.

* * * * *